United States Patent
Bernard et al.

(10) Patent No.: US 9,246,426 B2
(45) Date of Patent: Jan. 26, 2016

(54) METHOD AND SYSTEM FOR MONITORING PROGRESSIVE CHARGING OF AUTOMOBILE ALTERNATOR, AND AUTOMOBILE ALTERNATOR COMPRISING SUCH A SYSTEM

(75) Inventors: Francois-Xavier Bernard, Creteil (FR); Jean-Claude Matt, Dijon (FR)

(73) Assignee: Valeo Equipements Electriques Moteur, Creteil (FR)

( * ) Notice: Subject to any disclaimer, the term of this patent is extended or adjusted under 35 U.S.C. 154(b) by 41 days.

(21) Appl. No.: 14/346,229

(22) PCT Filed: Sep. 11, 2012

(86) PCT No.: PCT/FR2012/052021
§ 371 (c)(1),
(2), (4) Date: May 13, 2014

(87) PCT Pub. No.: WO2013/041794
PCT Pub. Date: Mar. 28, 2013

(65) Prior Publication Data
US 2014/0285161 A1   Sep. 25, 2014

(30) Foreign Application Priority Data
Sep. 20, 2011   (FR) ..................... 11 58332

(51) Int. Cl.
*H02P 11/00* (2006.01)
*H02P 9/08* (2006.01)
*H02P 9/10* (2006.01)
*H02P 9/48* (2006.01)

(52) U.S. Cl.
CPC ...... *H02P 9/08* (2013.01); *H02P 9/105* (2013.01); *H02P 9/107* (2013.01); *H02P 9/48* (2013.01)

(58) Field of Classification Search
CPC ........... H02P 9/48; H02P 9/107; H02P 9/105; H02P 9/08; F03D 5/02
USPC .......................... 322/22, 20, 24, 59
See application file for complete search history.

(56) References Cited

U.S. PATENT DOCUMENTS

| | | | | | |
|---|---|---|---|---|---|
| 6,137,247 | A | * | 10/2000 | Maehara et al. | 318/140 |
| 2008/0094034 | A1 | * | 4/2008 | Takahashi et al. | 320/134 |
| 2008/0143119 | A1 | * | 6/2008 | Asada | 290/40 B |
| 2008/0157725 | A1 | * | 7/2008 | Yoshida | 322/24 |
| 2008/0191482 | A1 | * | 8/2008 | Okuno | 290/7 |
| 2009/0039838 | A1 | * | 2/2009 | Maehara | 322/19 |
| 2009/0292501 | A1 | * | 11/2009 | Bernard et al. | 702/151 |

FOREIGN PATENT DOCUMENTS

DE   102007044591   4/2008
FR   2909815   6/2008

* cited by examiner

*Primary Examiner* — Julio Gonzalez Ramirez
(74) *Attorney, Agent, or Firm* — Berenato & White, LLC

(57) ABSTRACT

The method according to the invention involves limiting the charging of a vehicle alternator by only authorizing progressive augmentation of a current duty cycle (DC) of an excitation signal (7) of the alternator from an initial duty cycle to an expected duty cycle (EpsU) calculated by a control loop (1, 5, 6) of the alternator. According to the invention, a complementary limitation of the charging of the alternator involves limiting the increase of the current duty cycle (DC) according to at least one parameter of the heat engine involving an angular acceleration (mot) and/or a rotation speed (Nmot) of the heat motor. In particular, this complementary limitation can additionally involve limiting the increase of the current duty cycle (DC) according to a negative value of the angular acceleration (mot).

19 Claims, 3 Drawing Sheets

METHOD AND SYSTEM FOR MONITORING PROGRESSIVE CHARGING OF AUTOMOBILE ALTERNATOR, AND AUTOMOBILE ALTERNATOR COMPRISING SUCH A SYSTEM

CROSS-REFERENCE TO RELATED APPLICATIONS AND CLAIM TO PRIORITY

This application is a national stage application of International Application No. PCT/FR2012/052021 filed Sep. 11, 2012, which claims priority to French Patent Application No. 11/58332 filed Sep. 20, 2011, of which the disclosures are incorporated herein by reference and to which priority is claimed.

TECHNICAL FIELD OF THE INVENTION

The present invention relates to a method for controlling the progressive charging of an alternator which is designed to be coupled to a thermal engine of a motor vehicle. The invention also relates to a system which can implement this method, as well as the alternator which comprises this system.

TECHNOLOGICAL BACKGROUND OF THE INVENTION

In the motor vehicle industry it is well known to maintain a voltage which is supplied to the on-board electrical network by an alternator of the vehicle at a predetermined set value, independently of the speed of rotation of the engine or the electrical consumption of the equipment, by means of a regulation device known as a "regulator".

This regulator, which is generally incorporated in the alternator, controls an excitation current which is supplied by a battery and circulates in an excitation winding of the alternator.

At present, motor vehicle parts manufacturers have developed very high-performance alternators by implementing electronic power systems controlled by circuits which use digital techniques, based in particular on the use of microprocessors or microcontrollers.

These techniques make possible distinctly better stabilisation of the voltage of the on-board network than the previous bimetals, in response to the activation of substantial electric charges in the vehicle.

However, it can be conceived that an increased requirement for excitation current by the regulation system must not lead to a rapid increase in the torque taken out by the alternator from the thermal engine, which would be liable to stall the thermal engine, particularly when it is idling or is cold, when the vehicle is started.

It is thus known to limit the resistant torque taken out by an alternator from the thermal engine by means of a progressive charging function known as "LRC" (an acronym for "Load Response Control"). Control of the intensity of the excitation current is generally obtained by variation of the duty cycle of an excitation signal of the PWM ("Pulse Width Modulation") type which controls a power switch of the excitation circuit.

In a known manner, and further to detection of a charging requirement, the LRC function authorises only progressive increases of the duty cycle of the excitation signal from the initial value to the value determined by the control loop, by increasing this initial value by using a so-called "progressive charge return" intermediate signal.

Also in a known manner, the excitation signal which actually controls the excitation circuit is derived from the multiplexing of the excitation requirement signal generated by the control loop and the excitation signal produced by the LRC function, under the control of the LRC function.

However, the above-described type of LRC function is simply a systematic open loop action which does not really interact with modification of the on-board voltage or the speed of rotation of the engine.

In these conditions, the electronic control unit of the engine can have problems with stabilising the engine speed during idling.

GENERAL DESCRIPTION OF THE INVENTION

The object of the present invention is consequently to eliminate this disadvantage.

Its subject is specifically a method for controlling the progressive charging of a motor vehicle alternator which is designed to be coupled to a thermal engine of the vehicle.

In a known manner, an alternator of this type can produce a supply voltage of an on-board network of the vehicle which is forced to a set value by means of a control loop which controls an excitation signal of the variable pulse width type which controls an excitation current which circulates in an excitation winding of the alternator.

More specifically, the method in question consists of limiting the charging of the alternator on the thermal engine by authorising only progressive increases of a current duty cycle of the excitation signal from an initial duty cycle to an expected duty cycle calculated by the control loop.

The method according to the invention is distinguished in that a complementary limitation of the charging consists of limiting an increase in this current duty cycle according to:
- at least one parameter of the thermal engine constituted by an angular acceleration and/or a speed of rotation of the thermal engine; and
- also according to a frequency of variation of the speed of rotation and/or of a temperature of the thermal engine.

According to another characteristic of the method according to the invention, the angular acceleration of the engine is an acceleration with a negative value.

According to yet another characteristic of the method according to the invention, the complementary limitation is preferably applied only when a voltage difference between the supply voltage and the set value becomes greater than a predetermined value.

The invention also relates to a system for controlling the progressive charging of a motor vehicle alternator, which can implement the above-described method.

According to a known architecture, this alternator is designed to be coupled to a thermal engine of the vehicle, and comprises a control loop which forces a supply voltage of an on-board network of the vehicle to a set value, by controlling an excitation signal of the variable pulse width type, by controlling an excitation current which circulates in an excitation winding of the alternator.

The system in question is of the type comprising a main correction block which supplies as output a progressive charging control duty cycle, which increases progressively from an initial duty cycle to an expected duty cycle supplied as input by the control loop.

The system for controlling the progressive charging of a motor vehicle alternator according to the invention is distinguished is that it comprises at least one auxiliary correction block which supplies as output an auxiliary duty cycle which modifies the progressive charging control duty cycle, according to:

at least one parameter of the thermal engine constituted by the angular acceleration and/or the speed of rotation of the thermal engine; and also according to the frequency of variation of the speed of rotation and/or of the temperature of the thermal engine.

Highly advantageously, the auxiliary correction block comprises at least one module for limiting the parameter of the engine and/or a variation of this parameter.

The auxiliary correction block preferably comprises a control module of a type taken from amongst the group: PID, non-linear, with variable gain, with fuzzy logic.

The system for controlling the progressive charging of a motor vehicle alternator according to the invention also preferably comprises a triggering module with a hysteresis, which activates the auxiliary correction block when a voltage difference between the said supply voltage and the said set value becomes greater than a predetermined value.

The invention also relates to a motor vehicle alternator comprising a system for controlling the progressive charging, with the above described characteristics.

These few essential specifications will have made apparent to persons skilled in the art the advantages provided by the method for controlling the progressive charging of a motor vehicle alternator according to the invention, as well as by the control system and corresponding alternator, relative to the prior art.

The detailed specifications of the invention are provided in the following description in association with the appended drawings. It should be noted that these drawings serve the purpose only of illustrating the text of the description, and do not constitute in any way a limitation of the scope of the invention.

DESCRIPTION OF PREFERRED
EMBODIMENTS OF THE INVENTION

As already stated in the preamble, methods and systems for controlling the progressive charging of a motor vehicle alternator of the type according to the invention, for the purpose of improving functioning during idling, are well known in the prior art.

Figure 1:
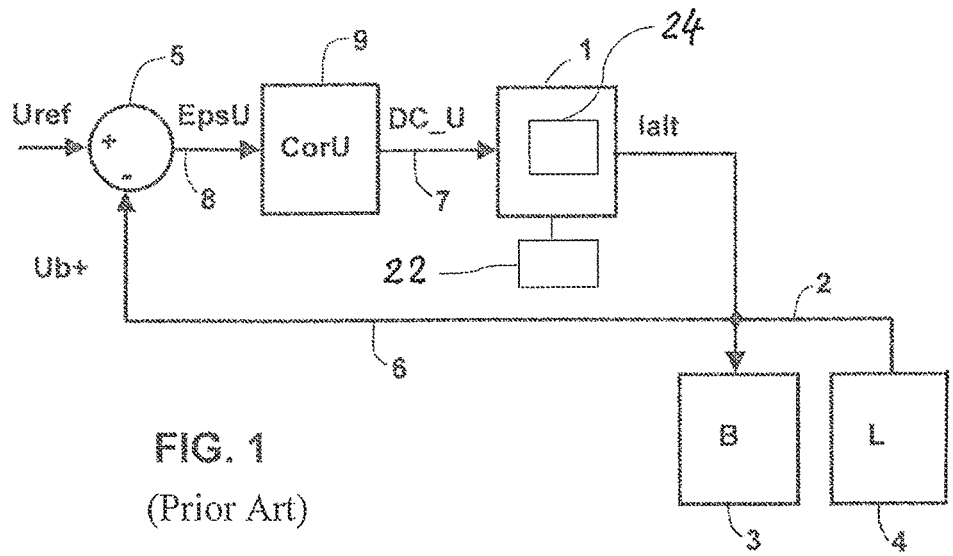
FIG. 1 is a synoptic diagram of the control loop of a motor vehicle alternator of a type known in the prior art.

A general architecture of a supply by an alternator 1 of an on-board network 2 of a motor vehicle, to which there are connected a battery 3 and electric charges 4, is represented in FIG. 1.

The supply voltage Ub+ tends to be kept constant, whilst being compared 5 continually with a set value Uref by a return supply 6.

According to the difference between the supply voltage Ub+ and the set value Uref, an excitation signal 7 of the variable pulse width type DC_U, which controls an excitation current which circulates in an excitation winding 24 of the alternator 1, is controlled by the control loop 1, 5, 6. The alternator 1 is designed to be coupled to a thermal engine 22 of the vehicle.

In nominal operation, the excitation signal 7 corresponds to the excitation requirement signal 8 which is supplied by the control loop 1, 5, 6, i.e. obtained from a comparator 5 between the supply voltage Ub+ and the set value Uref.

In transitory operation, such as further to the connection of an electric charge 4 to the on-board network 2, the increase in a current duty cycle DC_U of the excitation signal 7 is limited by a progressive charging control system 9, and reaches only progressively an expected duty cycle EpsU of the excitation requirement signal 8 calculated by the control loop 1, 5, 6.

Figure 2:
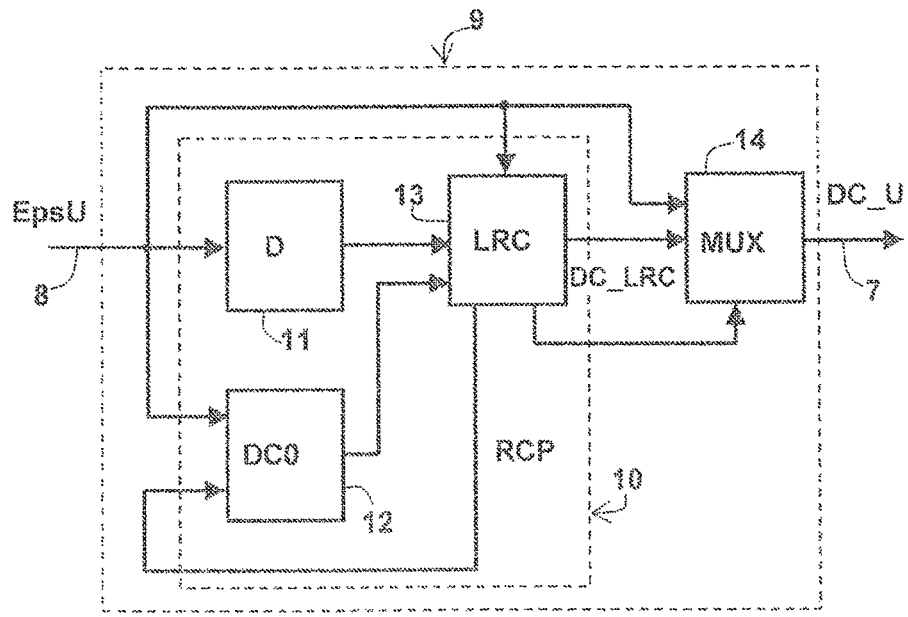
FIG. 2 is a synoptic diagram of a system for controlling the progressive charging of a motor vehicle alternator of a type known in the prior art.

FIG. 2 shows the arrangement of a progressive charging control system 9 of the type known in the prior art.

This system 9 comprises a digital processing block 10 comprising a first module 11 for detection of a charging requirement from an expected duty cycle EpsU supplied as input by the control loop 1, 5, 6, a second module 12 for determination of an initial duty cycle of the expected duty cycle EpsU, and a third module 13 for controlling the progressive charging, which supplies as output a progressive charging control duty cycle DC_LRC, which increases progressively from the initial duty cycle to the expected duty cycle EpsU.

The system 9 additionally comprises a multiplexer 14 controlled by the third progressive charging control module 13, which supplies as output an excitation signal 7 with a current duty cycle DC-U which is equal either to the expected duty cycle EpsU, or to the progressive charging control duty cycle DC-LRC supplied by the third module LRC 13 in the event of detection of a charging requirement.

The above detailed description of this system for controlling the progressive charging 9 known in the prior art shows that this system does not take into account any parameter of the thermal engine 22, such as its speed of rotation.

The object of the present invention is to improve the functioning, particularly during idling, of a prior progressive charging control system 9, by taking into account at least one parameter of this type.

For this purpose, there is added to a main charging limitation carried out in a known manner by a conventional LRC function, a complementary limitation carried out by an auxiliary loop 15, known as "feed forward", which limits the excitation control DC_U obtained from the control loop 1, 5, 6 and from the conventional LRC function 9, according to engine parameters.

Figure 3:
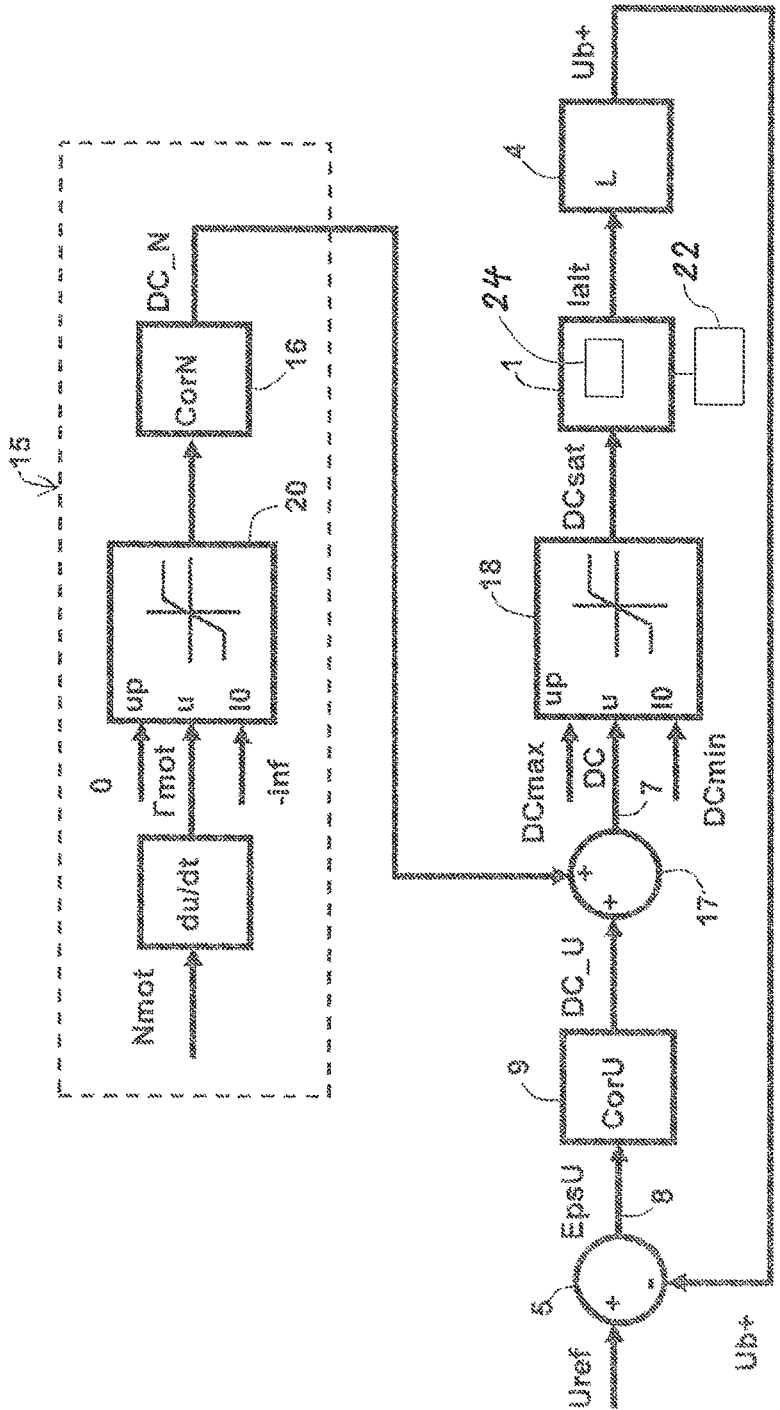
FIG. 3 is a synoptic diagram of a system for controlling the progressive charging of a motor vehicle alternator according to a first preferred embodiment of the invention.

In a first preferred embodiment of the progressive charging control system according to the invention, represented schematically in FIG. 3, account is taken of an angular acceleration Γmot of the thermal engine 22.

The system maintains the voltage of the on-board network Ub+ at its set value Uref, provided that the deceleration Γmot of the engine is not too sudden.

An auxiliary correction block 15 comprising a control module 16 develops an auxiliary duty cycle DC_N which is added 17 to the progressive charging control duty cycle DC_U developed by a main correction block 9 which provides a conventional LRC function.

The resulting duty cycle DC is then saturated 18 according to the characteristics of the electronic power circuits of the excitation circuit (simple chopper, combined bridge, or bridge in the form of an "H") in order to provide the final duty cycle DCsat for controlling the excitation of the alternator 1.

In this diagram (FIG. 3), the auxiliary loop 15 uses the negative angular acceleration Γmot (deceleration; tendency of the engine to stall), which is the main objective, but it can alternatively use positive angular acceleration Γmot ("overshoot") in order to assist the engine control in its speed regulation.

In other embodiments of the invention, the complementary limitation of the charging consists of limiting the current duty ratio DC according to other engine parameters, alternately or simultaneously:
- the speed of rotation Nmot of the thermal engine (the action is all the greater, the closer the engine speed is to idling);
- the temperature of the engine (the action is all the greater, the colder the engine);
- the repetitive effect of the speed variations, in order to adapt to the pulsed electrical charges (flashing, etc.), or to the acyclisms of the engine.

Figure 4:
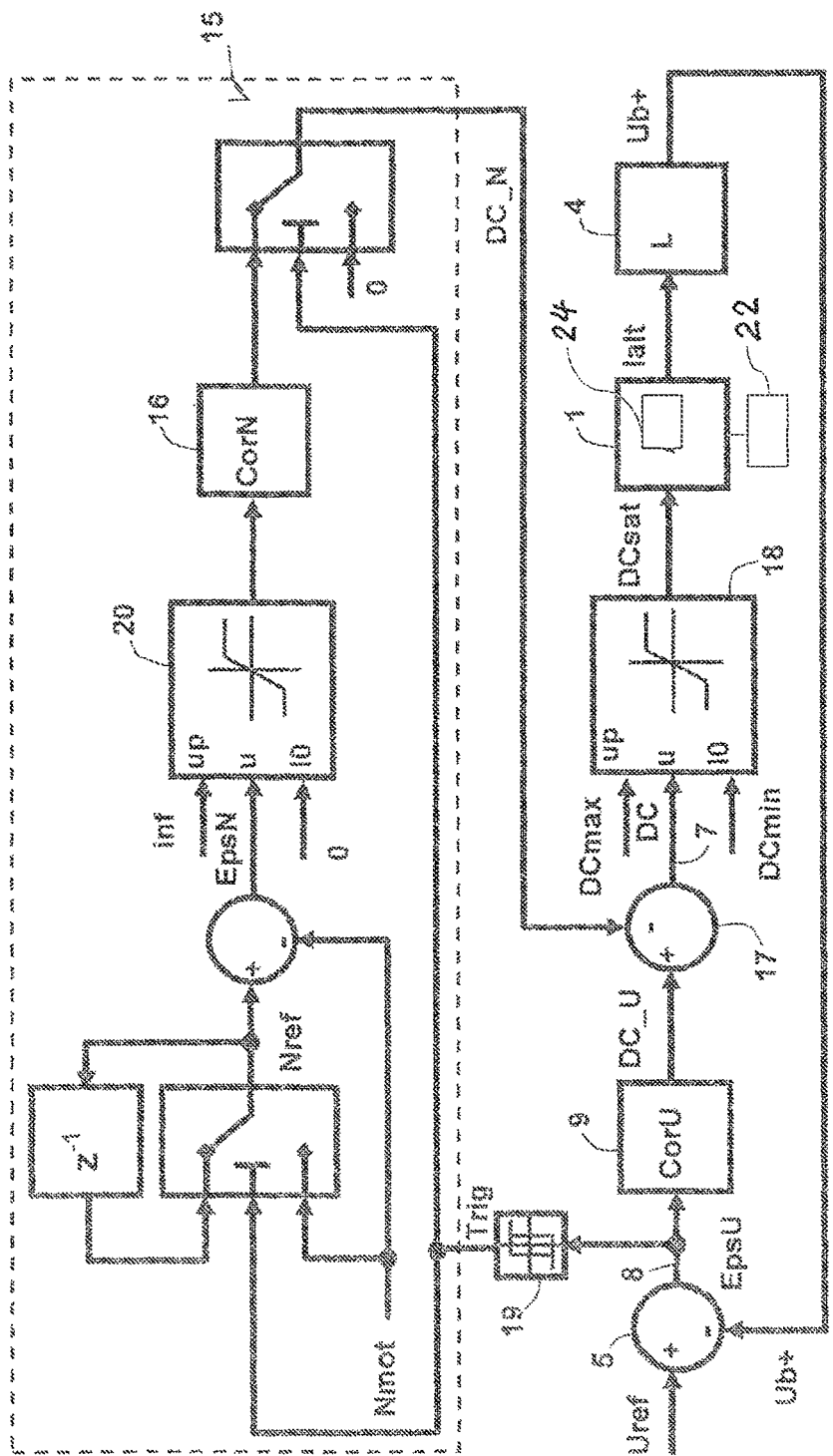
FIG. 4 is a synoptic diagram of a system for controlling the progressive charging of a motor vehicle alternator according to a second preferred embodiment of the invention.

For example, in a second preferred embodiment of the progressive charging control system according to the invention, represented schematically in FIG. 4, account is taken of the speed of rotation Nmot of the thermal engine, instead of the angular acceleration Γmot.

The method according to the invention implemented in this second embodiment is also different in that the auxiliary loop 15 is made to work only when there is a substantial charge requirement 4 (detected by scrutinising the voltage drop and regulating the speed of rotation of the engine Nmot to the value it had just before the disturbance).

For this purpose, the progressive charging control system according to the invention comprises a triggering system with a hysteresis 19 which develops a triggering signal Trig from the error EpsU of the control loop 1, 5, 6.

When a charge 4 is connected to the on-board network 2, and the voltage difference between the supply voltage Ub+ and the set value Uref exceeds a predetermined value, the triggering signal Trig becomes active.

The speed of rotation Nmot is captured, and becomes the reference rotation speed Nref.

If the error of the speed loop EpsN is positive, this means that the engine speed is affected by the increase in the load moment caused by the increase in the progressive charging control duty cycle DC_U by the correction block 9 in response to the charging increase.

The control module 16 of the auxiliary correction block 15 then develops an auxiliary duty cycle DC_N which is subtracted 17 from the progressive charging control duty cycle DC_U, in order to limit the load moment collected by the alternator 1, and to relieve the thermal engine.

Similarly to in the first embodiment, the resulting duty cycle DC is saturated 18 according to the characteristics of the electronic power circuits of the excitation circuit.

When the voltage difference between the supply voltage Ub+ and the set value Uref becomes lower than the predetermined value (to within a hysteresis threshold), the triggering signal Trig becomes inactive once more, and the auxiliary duty cycle DC_N is cancelled.

In all the embodiments of the progressive charging control system according to the invention, the control module 16 is preferably purely linear, of the PID (Proportional Integral Derivative) type, but alternatively it is of the non-linear type, or of the type with variable gain, or with fuzzy logic.

The dynamics of the engine parameters Nmot, Γmot captured, or their variations, are preferably limited by limiting modules 20 at the input of the control module 16.

It will be appreciated that the invention is not limited simply to the above-described preferred embodiments.

These other embodiments would not depart from the context of the present invention, provided that they are derived from the following claims.

The invention claimed is:

1. A method for controlling a progressive charging of a motor vehicle alternator (1), said alternator being designed to be coupled to a thermal engine of said vehicle for producing a supply voltage (Ub+) of an on-board network (2) of said vehicle forced to a set value (Uref) by a control loop (1, 5, 6) controlling an excitation signal (7) of a variable pulse width type (DC), said excitation signal (7) controlling an excitation current circulating in an excitation winding of said alternator (1), said method comprising the steps of:
  limiting said progressive charging by authorising only progressive increases of a current duty cycle (DC) of said excitation signal (7) from an initial duty cycle to an expected duty cycle (EpsU) calculated by said control loop (1, 5, 6); and
  limiting an increase in said current duty cycle (DC) according to:
    at least one of an angular acceleration (Γmot) of said thermal engine and a speed of rotation (Nmot) of said thermal engine; and
    at least one of a frequency of variation of said speed of rotation (Nmot) and a temperature of said thermal engine.

2. The method for controlling said progressive charging of a motor vehicle alternator (1) according to claim 1, wherein said angular acceleration (Γmot) of said thermal engine is an acceleration with a negative value.

3. The method for controlling said progressive charging of a motor vehicle alternator (1) according to claim 1, wherein the step of limiting said increase in said current duty cycle (DC) is applied only when a voltage difference between said supply voltage (Ub+) and said set value (Uref) becomes greater than a predetermined value.

4. A system for controlling a progressive charging of a motor vehicle alternator (1), said system configured to implement the method according to claim 1, said alternator (1) being designed to be coupled to a thermal engine (22) of a motor vehicle for producing a supply voltage (Ub+) of an on-board network (2) of said vehicle, said alternator comprising a control loop (1, 5, 6) forcing said supply voltage (Ub+) to a set value (Uref) by controlling an excitation signal (7) of a variable pulse width type (DC), said excitation signal (7) controlling an excitation current circulating in an excitation winding (24) of said alternator (1), said system comprising:
  a main correction block (9) supplying as output a progressive charging control duty cycle (DC_U), said progressive charging control duty cycle (DC_U) increasing progressively from an initial duty cycle to an expected duty cycle (EpsU) supplied as input by said control loop (1, 5, 6), and
  at least one auxiliary correction block (15) supplying as output an auxiliary duty cycle (DC_N) which modifies said progressive charging control duty cycle (DC_U) according to:
    at least one of an angular acceleration (Γmot) of said thermal engine and a speed of rotation (Nmot) of said thermal engine; and
    at least one of a frequency of variation of said speed of rotation (Nmot) and a temperature of said thermal engine;
  said system configured to implement a method for controlling the progressive charging of said alternator (1), said method comprising the steps of:

limiting said progressive charging by authorising only progressive increases of a current duty cycle (DC) of said excitation signal (7) from an initial duty cycle to an expected duty cycle (EpsU) calculated by said control loop (1, 5, 6); and limiting an increase in said current duty cycle (DC) according to:
- at least one of said angular acceleration (Γmot) and said speed of rotation (Nmot) of said thermal engine; and
- at least one of said frequency of variation of said speed of rotation (Nmot) and said temperature of said thermal engine.

5. The system for controlling said progressive charging of said motor vehicle alternator (1) according to claim 4, wherein said auxiliary correction block (15) comprises at least one module (20) for limiting said parameter (Γmot, Nmot) and/or a variation of said parameter.

6. The system for controlling said progressive charging of said motor vehicle alternator (1) according to claim 4, wherein said auxiliary correction block (15) comprises a control module (16) taken from the group: PID, non-linear, with variable gain, with fuzzy logic.

7. The system for controlling said progressive charging of said motor vehicle alternator (1) according to claim 4, further comprising a triggering module (19) with a hysteresis, which activates said auxiliary correction block (20) when a voltage difference between said supply voltage and said set value becomes greater than a predetermined value.

8. A motor vehicle alternator (1), comprising a system for controlling the progressive charging according to claim 4.

9. A method for controlling said progressive charging of said motor vehicle alternator (1) according to claim 2, wherein the step of limiting said increase in said current duty cycle (DC) is applied only when a voltage difference between said supply voltage (Ub+) and said set value (Uref) becomes greater than a predetermined value.

10. The system for controlling said progressive charging of said motor vehicle alternator (1) according to claim 5, wherein said auxiliary correction block (15) comprises a control module (16) taken from the group: PID, non-linear, with variable gain, with fuzzy logic.

11. The system for controlling said progressive charging of said motor vehicle alternator (1) according to claim 5, further comprising a triggering module (19) with a hysteresis, which activates said auxiliary correction block (20) when a voltage difference between said supply voltage and said set value becomes greater than a predetermined value.

12. The system for controlling said progressive charging of said motor vehicle alternator (1) according to claim 6, further comprising a triggering module (19) with a hysteresis, which activates said auxiliary correction block (20) when a voltage difference between said supply voltage and said set value becomes greater than a predetermined value.

13. A motor vehicle alternator (1), comprising a system for controlling a progressive charging according to claim 5.

14. A motor vehicle alternator (1), comprising a system for controlling a progressive charging according to claim 6.

15. A motor vehicle alternator (1), comprising a system for controlling a progressive charging according to claim 7.

16. The method for controlling said progressive charging of said alternator (1) according to claim 1, wherein said increase in said current duty cycle (DC) is limited according to said angular acceleration (Γmot) of said thermal engine and said frequency of variation of said speed of rotation (Nmot).

17. The method for controlling said progressive charging of said alternator (1) according to claim 1, wherein said increase in said current duty cycle (DC) is limited according to said angular acceleration (Γmot) of said thermal engine and said temperature of said thermal engine.

18. The method for controlling said progressive charging of said alternator (1) according to claim 1, wherein said increase in said current duty cycle (DC) is limited according to said speed of rotation (Nmot) of said thermal engine and said frequency of variation of said speed of rotation (Nmot).

19. The method for controlling said progressive charging of said alternator (1) according to claim 1, wherein said increase in said current duty cycle (DC) is limited according to said speed of rotation (Nmot) of said thermal engine and said temperature of said thermal engine.

\* \* \* \* \*